United States Patent
Dallas et al.

(10) Patent No.: US 8,205,916 B2
(45) Date of Patent: *Jun. 26, 2012

(54) HIGH-PRESSURE THREADED UNION WITH METAL-TO-METAL SEAL, AND METAL RING GASKET FOR SAME

(75) Inventors: L. Murray Dallas, Streetman, TX (US); Bob McGuire, Meridian, OK (US); Danny Lee Artherholt, Asher, OK (US)

(73) Assignee: Stinger Wellhead Protection, Inc., Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,379

(22) Filed: Apr. 4, 2011

(65) Prior Publication Data

US 2011/0175349 A1 Jul. 21, 2011

Related U.S. Application Data

(63) Continuation of application No. 12/652,967, filed on Jan. 6, 2010, now Pat. No. 7,922,216, which is a continuation of application No. 12/334,012, filed on Dec. 12, 2008, now Pat. No. 7,654,585, which is a continuation of application No. 11/182,588, filed on Jul. 14, 2005, now Pat. No. 7,484,776.

(51) Int. Cl.
*F16L 21/00* (2006.01)
*F16L 17/00* (2006.01)

(52) U.S. Cl. ........ 285/354; 285/355; 285/356; 285/386; 277/602; 277/644

(58) Field of Classification Search ............... 285/237, 285/354, 355, 357, 406, 386–389, 356; 277/602, 277/644, 344, 302

See application file for complete search history.

(56) References Cited

U.S. PATENT DOCUMENTS

| 648,232 A | 4/1900 | Brandt |
|---|---|---|
| 1,137,113 A | 4/1915 | Bouchard |
| 1,821,863 A | 9/1931 | Wilson |
| 1,825,962 A | 10/1931 | Laird |

(Continued)

FOREIGN PATENT DOCUMENTS

WO WO8903495 4/1989

OTHER PUBLICATIONS

Product description "S Elastomer Seal," Cooper Cameron Corporation Internet Homepage at www.camerondiv.com. Copyright Date of Year Only is 2001-2003.

(Continued)

*Primary Examiner* — James Hewitt
*Assistant Examiner* — Jay R Ripley
(74) *Attorney, Agent, or Firm* — Nelson Mullins Riley & Scarborough, LLP

(57) ABSTRACT

A metal ring gasket provides a high-pressure temperature tolerant metal-to-metal seal between subcomponents of a threaded union. The metal ring gasket is received in an annular cavity formed between mating surfaces of the subcomponents of the threaded union. The metal ring gasket is capable of maintaining a fluid seal even at very high temperatures resulting from direct exposure to fire. At high fluid pressures the metal ring gasket is energized because hoop stress induced by the fluid pressure forces the metal ring gasket into tighter contact with the subcomponents of the threaded union.

20 Claims, 5 Drawing Sheets

U.S. PATENT DOCUMENTS

| | | | |
|---|---|---|---|
| 2,013,293 | A | 9/1935 | Snell et al. |
| 2,109,031 | A | 2/1938 | O'Neal |
| 2,318,112 | A | 5/1943 | Stillwagon |
| 2,417,025 | A | 3/1947 | Volpin |
| 2,417,181 | A | 3/1947 | Sandilands |
| 2,646,996 | A | 7/1953 | Parmesan |
| 2,705,651 | A | 4/1955 | Myers |
| 2,780,483 | A | 2/1957 | Kessler |
| 3,158,389 | A | 11/1964 | Turner |
| 3,343,603 | A | 9/1967 | Miller |
| 3,637,223 | A | 1/1972 | Weber |
| 3,675,719 | A | 7/1972 | Slator et al. |
| 4,043,575 | A | 8/1977 | Roth |
| 4,056,272 | A | 11/1977 | Morrill |
| 4,159,135 | A | 6/1979 | Richardson |
| 4,281,724 | A | 8/1981 | Garrett |
| 4,303,251 | A | 12/1981 | Harra et al. |
| 4,353,420 | A | 10/1982 | Miller |
| 4,410,186 | A | 10/1983 | Pierce, Jr. |
| 4,416,575 | A | 11/1983 | McCarthy |
| 4,487,434 | A | 12/1984 | Roche |
| 4,657,075 | A | 4/1987 | McLeod |
| 4,690,221 | A | 9/1987 | Ritter, Jr. |
| 4,771,832 | A | 9/1988 | Bridges |
| 4,802,695 | A | 2/1989 | Weinhold |
| 4,832,381 | A | 5/1989 | Boulton |
| 4,919,456 | A | 4/1990 | Wong |
| 4,921,284 | A | 5/1990 | Singeetham |
| 4,993,488 | A | 2/1991 | McLeod |
| 5,016,920 | A | 5/1991 | Anderson |
| 5,092,401 | A | 3/1992 | Heynen |
| 5,103,900 | A | 4/1992 | McLeod et al. |
| 5,251,941 | A | 10/1993 | McGarvey |
| 5,257,792 | A | 11/1993 | Putch et al. |
| 5,284,320 | A | 2/1994 | Michael et al. |
| 5,388,639 | A | 2/1995 | Betchan et al. |
| 5,492,373 | A | 2/1996 | Smith |
| 5,505,498 | A | 4/1996 | Halling et al. |
| 5,553,902 | A | 9/1996 | Powers |
| 5,605,194 | A | 2/1997 | Smith |
| 5,660,234 | A | 8/1997 | Hebert et al. |
| 6,145,596 | A | 11/2000 | Dallas |
| 6,179,053 | B1 | 1/2001 | Dallas |
| 6,196,323 | B1 | 3/2001 | Moksvold |
| 6,199,914 | B1 | 3/2001 | Duhn |
| 6,220,363 | B1 | 4/2001 | Dallas |
| 6,247,537 | B1 | 6/2001 | Dallas |
| 6,289,993 | B1 | 9/2001 | Dallas |
| 6,299,216 | B1 | 10/2001 | Thompson |
| 6,364,024 | B1 | 4/2002 | Dallas |
| 6,491,098 | B1 | 12/2002 | Dallas |
| 6,557,629 | B2 | 5/2003 | Wong et al. |
| 6,626,245 | B1 | 9/2003 | Dallas |
| 6,637,514 | B1 | 10/2003 | Donald et al. |
| 6,715,802 | B2 | 4/2004 | Baker |
| 6,764,109 | B2 | 7/2004 | Richardson et al. |
| 6,769,489 | B2 | 8/2004 | Dallas |
| 6,817,421 | B2 | 11/2004 | Dallas |
| 6,817,423 | B2 | 11/2004 | Dallas |
| 6,827,147 | B2 | 12/2004 | Dallas |
| 6,918,439 | B2 | 7/2005 | Dallas |
| 6,938,696 | B2 | 9/2005 | Dallas |
| 6,948,565 | B2 | 9/2005 | Dallas |
| 7,032,677 | B2 | 4/2006 | McGuire et al. |
| 7,040,410 | B2 | 5/2006 | McGuire et al. |
| 7,066,269 | B2 | 6/2006 | Dallas et al. |
| 7,125,055 | B2 | 10/2006 | Dallas |
| 7,159,652 | B2 | 1/2007 | McGuire et al. |
| 2004/0090016 | A1 | 5/2004 | Sharp |
| 2005/0082829 | A1* | 4/2005 | Dallas .......................... 285/354 |

OTHER PUBLICATIONS

Techdrill Limited "Hammer Lug Unions," Internet information at www.techdrill.co.uk, Sep. 22, 2003.
Anson "Hammer Lug Union Specifications," Internet information at www.anson.co.uk, Sep. 22, 2003.
Anson "Hammer Lug Unions—Seals," Internet information at www.anson.co.uk, Sep. 22, 2003.
C&C Industries LLC "Hammer Unions," Internet information at www.candcvalve.com. Copyright Date of Year Only is 2002.

* cited by examiner

HIGH-PRESSURE THREADED UNION WITH METAL-TO-METAL SEAL, AND METAL RING GASKET FOR SAME

CROSS-REFERENCE TO RELATED APPLICATIONS

This is a continuation of U.S. patent application Ser. No. 12/652,967 filed Jan. 6, 2010, now U.S. Pat. No. 7,922,216; which was a continuation of U.S. patent application Ser. No. 12/334,012 filed Dec. 12, 2008, now U.S. Pat. No. 7,654,585; which was a continuation of U.S. patent application Ser. No. 11/182,588 filed Jul. 14, 2005, now U.S. Pat. No. 7,484,776.

MICROFICHE APPENDIX

Not Applicable.

TECHNICAL FIELD

The present invention relates generally to sealed joints for high-pressure fluid conduits and, in particular, to a metal ring gasket for threaded unions for use in very high fluid pressure applications.

BACKGROUND OF THE INVENTION

Threaded unions are used to provide fluid-tight joints in fluid conduits. Threaded unions are held together by a threaded nut that is tightened to a required torque using a hammer or a wrench. In the oil industry, threaded unions are generally constructed using "wing nuts" and are commonly called "hammer unions" or "hammer lug unions". Hammer unions are designed and manufactured in accordance with the specifications stipulated by the American Petroleum Institute in API 6A entitled "Specification for Wellhead and Christmas Tree Equipment". Hammer unions are usually available in a variety of sizes (1" to 12") and a variety of pressure ratings (1000 psi to over 20,000 psi).

One substantial disadvantage of most prior-art threaded unions is that they rely on elastomeric seals for achieving a fluid-tight joint. Elastomeric seals are vulnerable to the extreme temperatures generated by fire. In the event that a fire erupts around a high-pressure conduit, the elastomeric seal in the threaded union may leak or fail completely which may exacerbate the fire if the leak permits combustible fluids to escape to the atmosphere.

While flanged unions are commonly used in well trees, pipelines and other high-pressure applications where temperature tolerant seals are required, flanged unions are relatively expensive to construct and time-consuming to assemble in the field. Metal ring gaskets are known for flanged unions, such as the BX ring gasket manufactured in accordance with API 6A. In operation, however, these BX ring gaskets are deformed beyond their yield strength and must be discarded after a single load cycle.

It is well known in the art that there is increasing pressure on the oil industry to produce hydrocarbons at a lower cost. Consequently, an interest has developed in utilizing wellhead equipment that is less expensive to construct and is more quickly assembled than prior art flanged unions. Threaded unions provide a good alternative to flanged unions from a cost standpoint because they are faster to assemble and less expensive to construct. However, due to safety concerns related to the lack of a reliable high-pressure metal-to-metal seal, use of threaded unions for well tree components and other high-pressure temperature tolerant applications has not been endorsed.

Therefore, it is highly desirable to provide an improved threaded union having a high-pressure metal-to-metal seal.

SUMMARY OF THE INVENTION

It is therefore an object of the present invention to provide an improved threaded union for providing a high-pressure, fluid-tight, metal-to-metal seal.

The invention therefore provides a threaded union including a nut that draws together respective mating ends of a first subcomponent and a second subcomponent of the threaded union; the mating end of the first subcomponent comprising a first annular groove that mates with a complementary second annular groove in the mating end of the second subcomponent, the complementary first and second annular grooves respectively having a sloped annular outer face that extends to a respective planar bottom surface of the respective annular grooves; and a metal ring gasket received in the respective annular grooves, the metal ring gasket having a planar top face, a planar bottom face that is parallel to the planar top face, a cylindrical outer face that is perpendicular to the top and bottom faces, and an annular sloped surface between each of the planar top face, the planar bottom face and the cylindrical outer face, the metal ring gasket being elastically deformed, without any plastic deformation, by contact between only the respective sloped annular outer faces of the respective annular grooves and the respective annular sloped surfaces of the metal ring gasket when the mating ends of first and second subcomponents are drawn together by the nut.

The invention further provides a high-pressure fluid conduit including a first fluid conduit subcomponent having a pin end with an annular groove in the pin end, a second fluid conduit subcomponent having a socket end that receives the pin end and has a complementary second annular groove in a bottom of the socket, the first and second annular grooves having respective annular outer faces that slope inwardly to a planar annular bottom surface of the respective annular grooves; and a metal ring gasket compressed between the respective ends of the first and the second fluid conduit subcomponents, the metal ring gasket deforming elastically, without plastic deformation, to provide an energized high-pressure fluid seal when the first and second fluid conduit subcomponents are drawn together by a nut, the metal ring gasket having a planar top face, a planar bottom face that is parallel to the planar top face, a cylindrical outer face, and an annular sloped surface between each of the planar top and bottom faces and the cylindrical outer face, the metal ring gasket being compressed by contact with only the respective first and second sloped annular outer faces of the respective first and second annular grooves when the first and second fluid conduit subcomponents are drawn together by the nut.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF PREFERRED EMBODIMENTS

The invention provides a threaded union with a metal ring gasket that provides a high-pressure, temperature tolerant, metal-to-metal fluid seal between a first subcomponent and a second subcomponent of the threaded union. The metal ring gasket is made of ductile carbon steel for non-corrosive fluid service or ductile stainless steel for corrosive fluid service. The metal ring gasket has outer beveled corners and is received in a beveled annular groove in a mating end of the first subcomponent. When compressed between the first and the second subcomponents, the metal ring gasket deforms elastically to provide an energized high-pressure fluid seal. The high-pressure seal is capable of containing fluid pressures of up to at least 30,000 pounds per square inch (psi), and is not affected by elevated temperatures below a melting point of the ductile steel of the metal ring gasket.

Throughout this specification, the terms "first subcomponent" and "second subcomponent" are meant to denote any two contiguous components of a joint in a fluid conduit that are joined together using a threaded nut.

Figure 1:
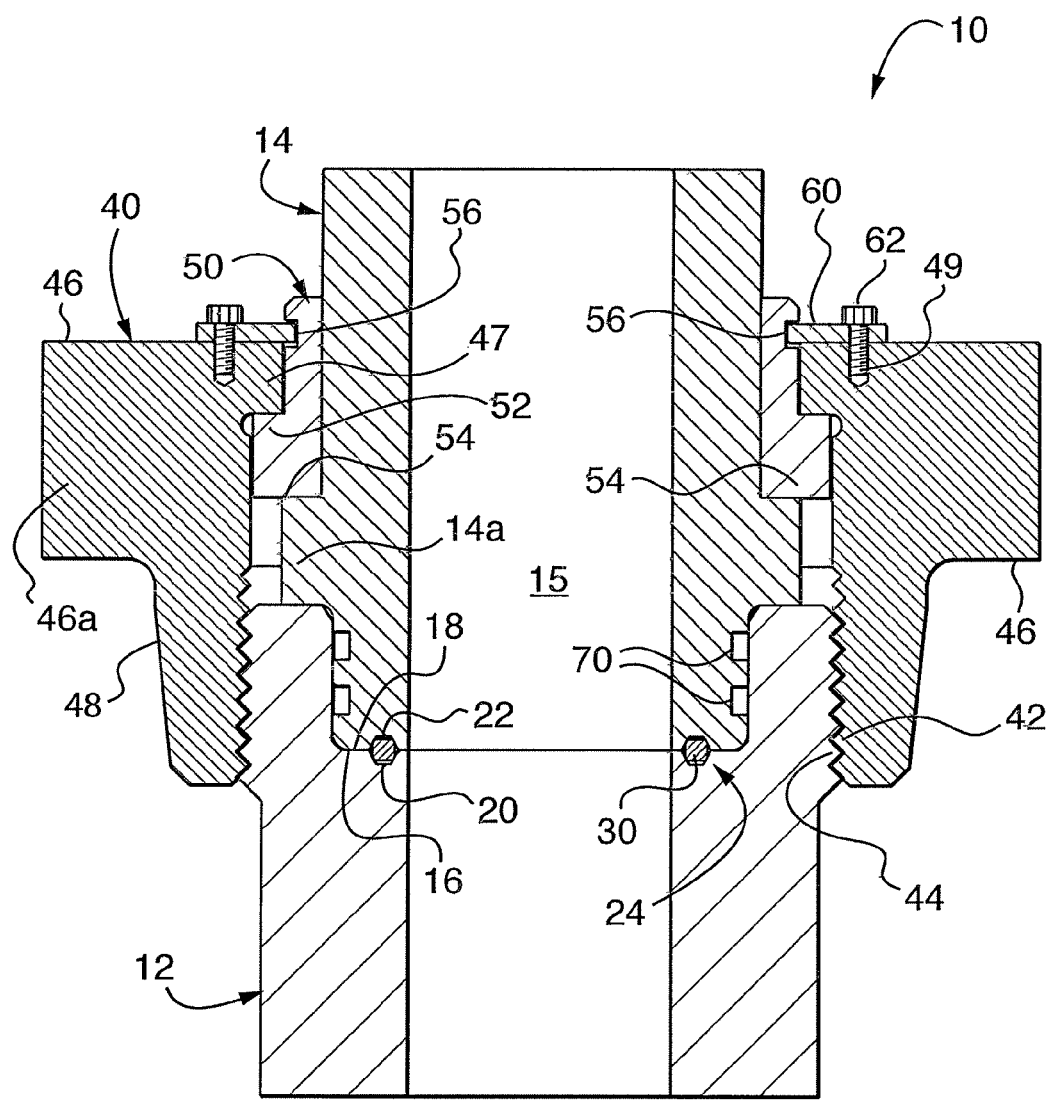
FIG. 1 is a cross-sectional view of a threaded union and a metal ring gasket in accordance with one embodiment of the invention.

FIG. 1 illustrates a threaded union 10 in accordance with an embodiment of the invention. The threaded union 10 includes a first subcomponent 12 and a second subcomponent 14. The first and second subcomponents 12, 14 are generally annular bodies that are interconnected to define a central fluid passageway 15 as part of a high-pressure fluid conduit. The first subcomponent 12 has a mating end 16 that abuts a mating end 18 of the second subcomponent 14. The first subcomponent 12 has a top surface that includes an upwardly facing annular groove 20. The upwardly facing annular groove 20 is dimensioned to receive a metal ring gasket 30 in accordance with the invention. The second subcomponent 14 has a bottom surface that includes a downwardly facing annular groove 22. The upwardly facing and downwardly facing annular grooves 20, 22 mate when the second subcomponent 14 is connected to the first subcomponent 12 to define a hexagonal annular cavity 24. However, as will be explained below, the annular cavity 24 need not necessarily be hexagonal to provide the energized high-pressure fluid seal in accordance with the invention.

As shown in FIG. 1, the second subcomponent 14 is secured to the first subcomponent 12 by a threaded nut 40. The threaded nut 40 has box threads 42 for engaging pin threads 44 formed externally on the first subcomponent 12. In one embodiment, the threaded nut 40 is a wing nut and includes a plurality of lugs 46 that extend radially from a main body 48 of the threaded nut 40. The lugs 46 have impact surfaces 46a which may be impact-torqued using a hammer or mallet (not shown) in the usual way in which a hammer union is "hammered up". In another embodiment, the threaded nut 40 is a "spanner nut" that includes flats, bores, or the like, that are gripped by a spanner wrench (not shown) to permit the threaded nut 40 to be tightened to a required torque. As will be understood by those skilled in the art, the wrench used to tighten the nut may be a torque wrench, which indicates the torque applied to the threaded nut 40 to ensure that it is tightened with a precise amount of torque.

The threaded nut 40 in accordance with this embodiment of this invention is constructed in three parts so that a main body of the nut 40 can be a single piece construction for greater strength. As is understood by those skilled in the art, the nuts for hammer unions are commonly cut into two parts that are welded together in situ after the nut is positioned above an annular shoulder 14a of the second subcomponent 14. However, this compromises the holding strength of the nut, which is strained when the hammer union is exposed to very high fluid pressure. The threaded nut 40 in accordance with the invention has an upper annular shoulder 47 that extends radially inwardly from a top of the main body 48 of the nut 40. The annular shoulder 47 abuts a flange 52 that extends radially outwardly from an adapter collar 50. The adapter collar 50 is a generally annular multi-piece body having an inner diameter dimensioned to slide over an outer surface of the second subcomponent 14 until a bottom surface 54 of the adapter collar 50 abuts the annular shoulder 14a of the second subcomponent 14. A bottom surface of the annular shoulder 14a, in turn, abuts a top surface 16 of the first subcomponent 12. When torque is applied to the nut 40, the upper annular shoulder 47 of the nut 40 is forced downwardly on the flange 52, which in turn exerts a downward force on the annular shoulder 14a, thereby forcing the bottom surface 18 of the second component 14 against the top surface 16 of the first subcomponent 12, and thus forcing the metal ring gasket 30 to a set position in the annular cavity 24. In one embodiment, the multi-piece adapter collar 50 is constructed of two symmetrical parts.

As further shown in FIG. 1, the adapter collar 50 includes an annular groove 56 dimensioned to receive an inner edge of a segmented retainer plate 60. The segmented retainer plate 60 is secured to a top of the nut 40 by threaded fasteners 62, which are received in a plurality of tapped bores 49 distributed in a circular pattern around a top of the nut. In one embodiment, the segmented retainer plate 60 is constructed of three wedge-shaped pieces.

In the embodiment shown in FIG. 1, the metal ring gasket 30 provides a high-pressure metal-to-metal seal between the first and second subcomponents 12, 14. The threaded union 10 also includes a pair of elastomeric backup seals, e.g. O-rings, which are seated in annular grooves 70 in the second subcomponent. Alternatively, the annular grooves 70 could be machined into the first subcomponent. It will be appreciated that the number of elastomeric annular sealing elements can be varied from zero to three or more.

Figure 2:
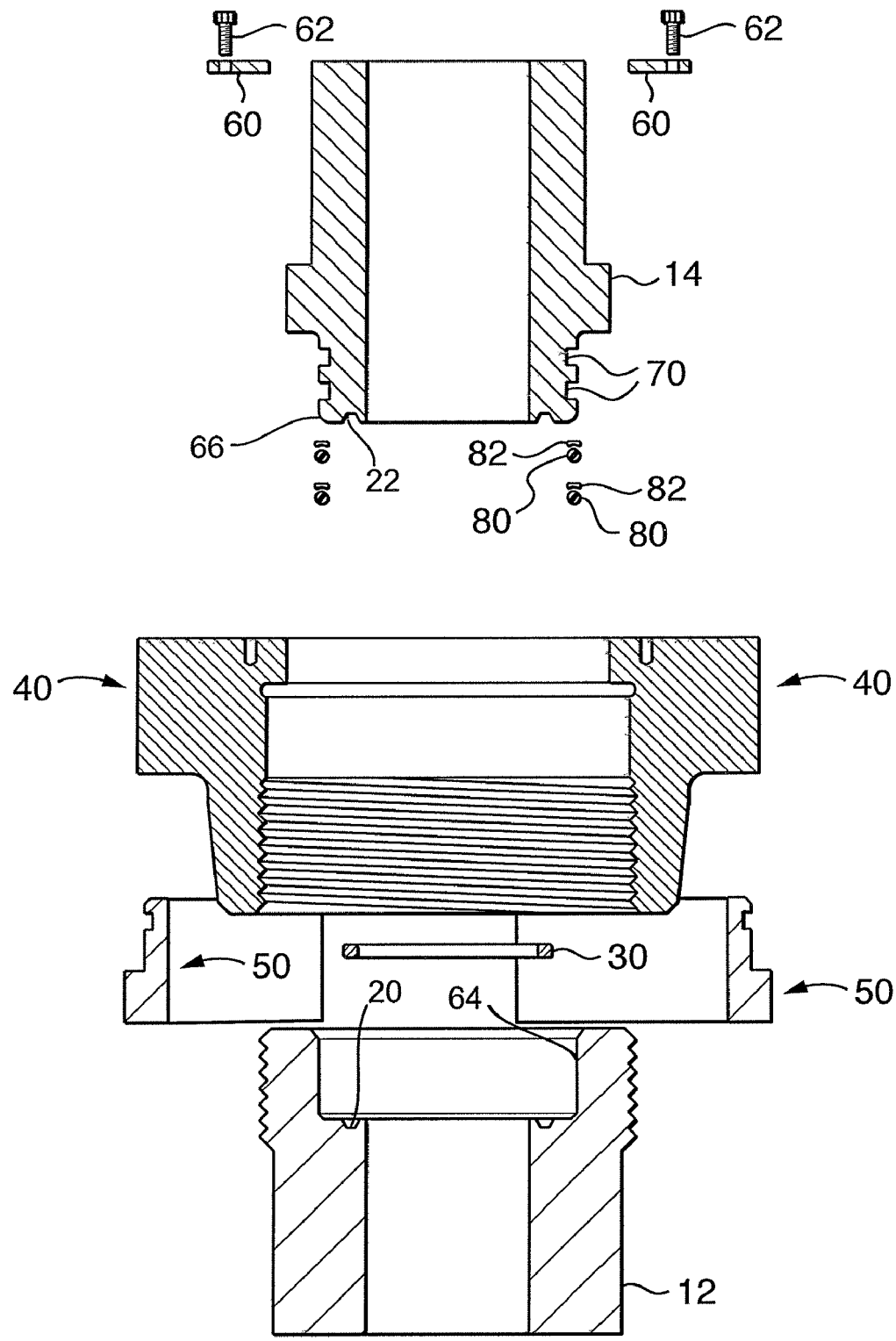
FIG. 2 is an exploded, cross-sectional view of the threaded union shown in FIG. 1.

FIG. 2 illustrates, in an exploded view, the threaded union 10 shown in FIG. 1. As shown in FIG. 2, the threaded union 10 includes a pair of O-rings 80, each having its own backing member 82. The O-rings 80 and backing members 82 are dimensioned to be received in each of the two annular grooves 70 in order to provide the elastomeric backup seal to the metal-to-metal seal provided by the metal ring gasket 30. As is apparent, in this embodiment the first subcomponent 12 includes a socket 64 and the upwardly facing annular groove 20 is located in the bottom of the socket 64. The second subcomponent 14 includes a pin end 66 and the downwardly facing annular groove 22 is located on a bottom of the pin end 66. When the first subcomponent 12 and the second subcomponent 14 are interconnected, the socket 64 receives the pin end 66.

Figure 3:
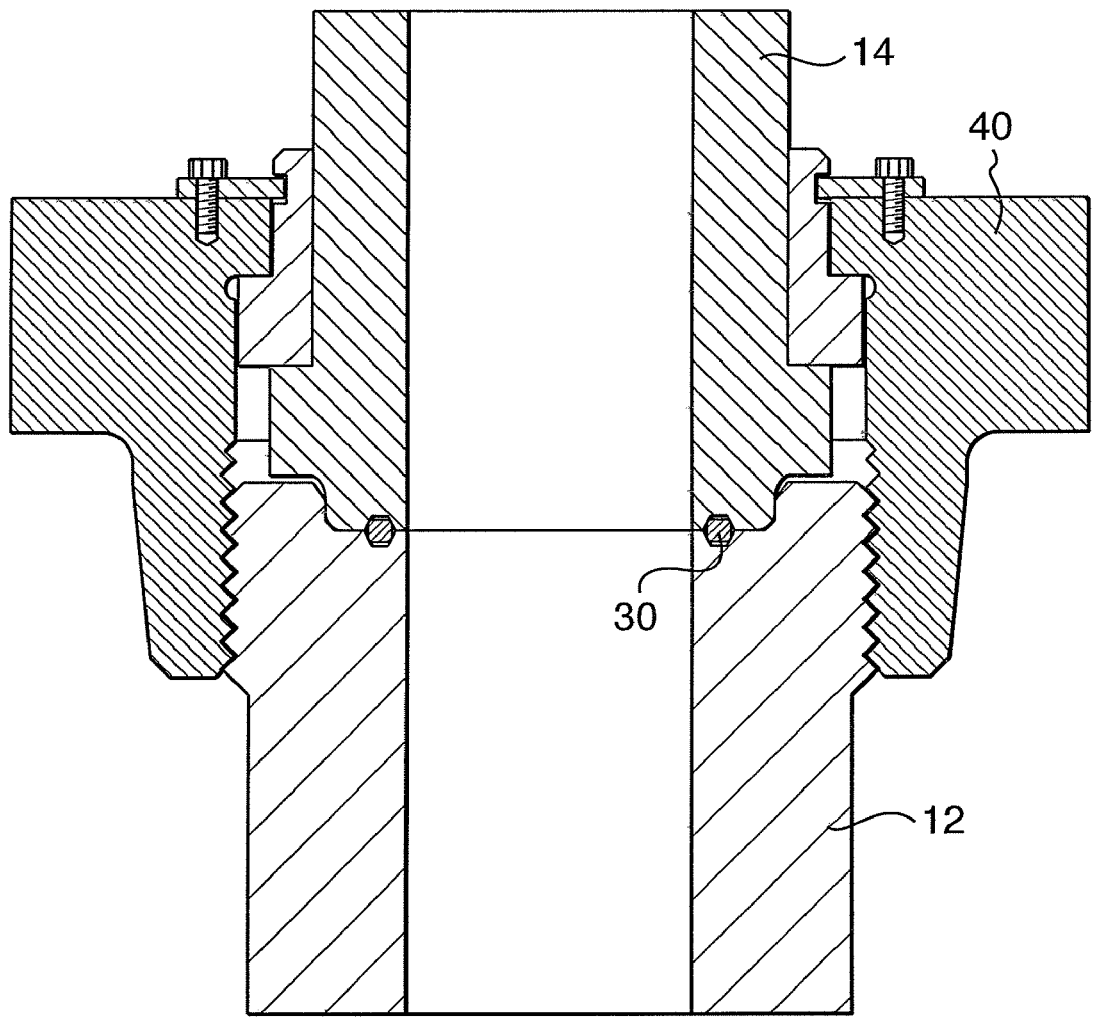
FIG. 3 is a cross-sectional view of a threaded union and a metal ring gasket in accordance with another embodiment of the invention.

FIG. 3 illustrates a threaded union 10 in accordance with another embodiment of the invention. The high-pressure fluid-tight seal between the first and second subcomponents 12, 14 is provided only by the metal ring gasket 30. Otherwise, the embodiments shown in FIGS. 2 and 3 are identical.

In testing, the metal ring gasket 30 has maintained a fluid-tight seal up to a fluid pressure of 30,000 psi. The metal ring gasket is also able to maintain a high-pressure seal even if exposed to elevated temperatures due to fire.

Figure 4:
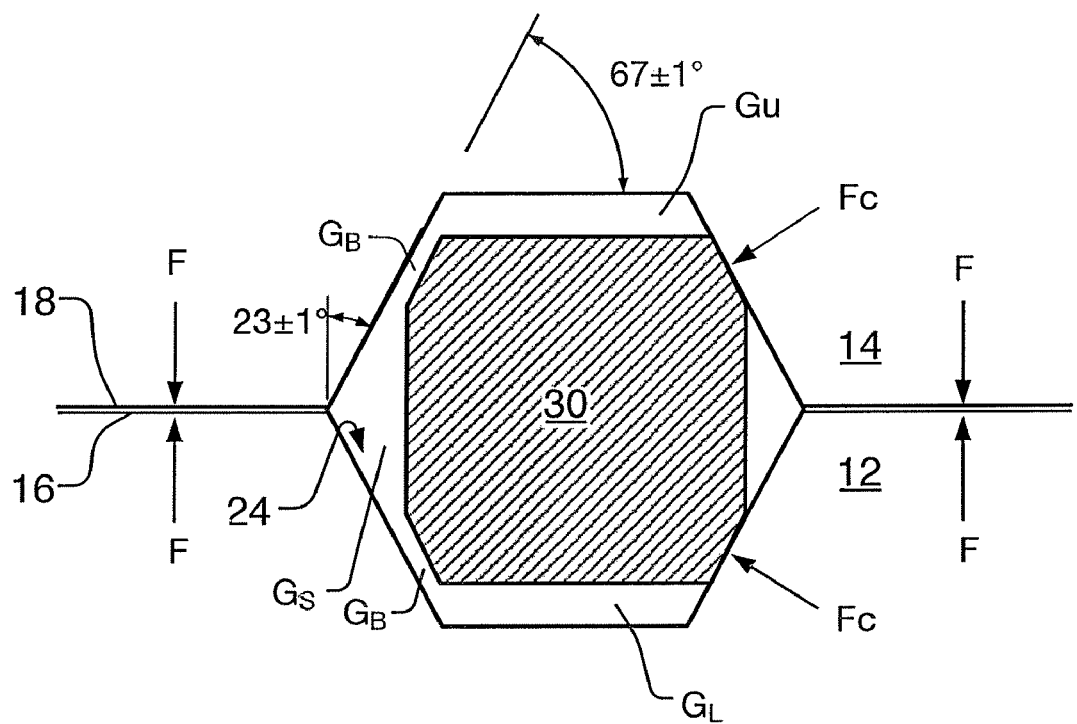
FIG. 4 is a cross-sectional view of the metal ring gasket shown in FIGS. 1-3 immediately prior to elastic deformation of the metal ring gasket as the threaded union is tightened to a sealed condition.

As illustrated in FIG. 4, one embodiment of the invention metal ring gasket 30 has beveled corners (or beveled surfaces) and an octagonal cross-section. In one embodiment, the corners of the metal ring gasket are beveled at an angle of $23°±1°$. Persons skilled in the art will appreciate that the bevel angle may be changed within limits without affecting the efficacy of the energized seal. The metal ring gasket 30 is preferably made of steel. Plain carbon steel or stainless steel is selected depending on whether a fluid to be contained is corrosive or non-corrosive.

For service where corrosion is not generally problematic AISI 1018 nickel-plated cold-drawn steel may be used. The AISI 1018 steel has a carbon content of 0.18% (although it may vary from 0.14% to 0.20%), a manganese content of 0.6% to 0.9%, a maximum phosphorus content of 0.04% and a maximum sulfur content of 0.05%. The AISI 1018 steel exhibits high machinability (its average machinability rating is 70%), good fracture toughness, good surface hardness (126 HB), high tensile strength (440 MPa), high yield strength (370 MPa), superior ductility (40-50% reduction in cross-sectional area at the fracture load) and is relatively inexpensive. Alternatively, other plain carbon steels may be substituted, provided they have approximately similar mechanical properties.

For service where corrosion is problematic the metal ring gasket may be made using either AISI 316 stainless steel or AISI 304 stainless steel. Not only are these stainless steels corrosion-resistant but they also possess desirable mechanical properties (in terms of machinability, fracture toughness, surface hardness, tensile strength and yield strength).

Alternatively, persons skilled in the art will appreciate that, for certain applications, the metal ring gaskets in accordance with the invention may be made using metals other than steel (such as aluminum or copper alloys like brass or bronze, for example), which are more temperature-resistant than elastomeric gaskets.

As illustrated schematically in FIG. 4, when the threaded nut 40 is tightened, the nut 40 exerts a force F on the first and second subcomponent 12,14. The forces F elastically deforms the metal ring gasket 30 within the annular cavity 24. The compressive force $F_C$ acting on the outer beveled surfaces can be expressed by the equation: $F_C = F \sin 23°$, assuming a bevel angle of 23°.

FIG. 4 shows the undeformed metal ring gasket 30 in substantially unloaded contact with the inner beveled surfaces of the annular cavity 24, for example immediately prior to or immediately after torquing of the threaded nut 40. When the threaded nut 40 has been tightened to the extent shown in FIG. 4, the annular cavity 24 has a hexagonal cross section with internal beveled surfaces, or facets, that have angles that correspond to the bevel angles of the octagonal cross section of the metal ring gasket 30. As shown in FIG. 4, the top, bottom and inner side surfaces of the metal ring gasket do not contact the top, bottom or inner surfaces of the annular cavity 24. In other words, there remains at all times, even after full torque, an upper gap $G_U$ between the top surface of the metal ring gasket and the top (inner) surface of the annular cavity 24. Likewise, there remains at all times a lower gap $G_L$ between the bottom surface of the metal ring gasket 30 and the bottom (inner) surface of the annular cavity 24, a gap $G_S$ between the inner side of the metal ring gasket 30 and the inner side of the annular cavity 24; and, a gap $G_B$ between the inner beveled corners of the metal ring gasket 30 and the annular cavity 24.

When the forces $F_C$ act on each of the outer beveled corners the metal ring gasket 30 the forces cause the metal ring gasket 30 to be elastically deformed inwardly to provide a fluid-tight seal between the first and second subcomponents.

Figure 5:
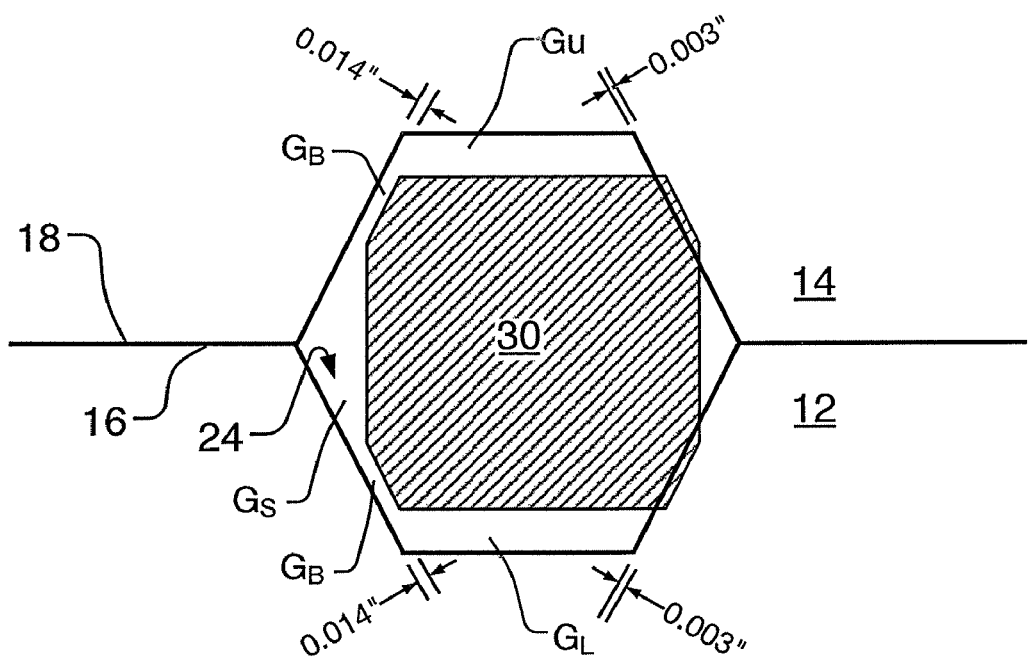
FIG. 5 is a cross-sectional view of the metal ring gasket shown in FIGS. 1-3 schematically illustrating an extent of elastic deformation of the metal ring gasket when the threaded union is in the sealed condition.

As schematically illustrated in FIG. 5, the metal ring gasket is over-sized to have an outer diameter such that the outer beveled corners must be displaced by elastic deformation causing annular compression of the metal ring gasket 30 by about 0.003" when the first subcomponent 12 and the second subcomponent 14 are securely interconnected. It should be noted that in FIG. 5 the oversizing of the metal ring gasket is shown at an exaggerated scale for the purposes of illustration. The 0.003" oversizing is considered optimal for the steels described above because the metal ring gasket 30 is elastically, and not plastically deformed in the annular cavity 24. It will be appreciated that for other steels, and/or for other sizes of threaded unions, the oversizing may be different to provide an optimal seal. As further shown in FIG. 5, an inner diameter of the metal ring gasket 30 is larger than a diameter of the annular cavity 24. In one embodiment the inner diameter of the metal seal ring is such that the gap $G_B$ is at least 0.001" after the metal ring gasket 30 is elastically deformed in the annular groove 24. In one embodiment, the inner diameter of the metal ring gasket 30 is about 0.014" larger than an inner diameter of the annular cavity 24 before the metal ring gasket is elastically deformed. However, this difference in the diameters is not critical and can be varied considerably, so long as the metal ring gasket 30 can be elastically deformed without the elastic deformation being inhibited by contact with an inner face of the annular cavity 24. Consequently, if an inner diameter of the metal ring gasket is at least 0.003" larger than an inner diameter of the annular cavity 24, the metal ring gasket can be elastically deformed as required.

In operation, the threaded union 10 is torqued or "hammered up" by tightening the nut 40 until the end surfaces 16,18 of the first and second subcomponents 12,14 abut. Due to the slight over-sizing (about 0.003") of the metal ring gasket 30, the threaded union cannot be overtorqued, and there is no danger of plastic deformation of the metal ring gasket 30. The metal ring gasket 30 can therefore be repeatedly reused so long as the sealing surfaces on its beveled faces are not scratched or marred.

Figure 6:
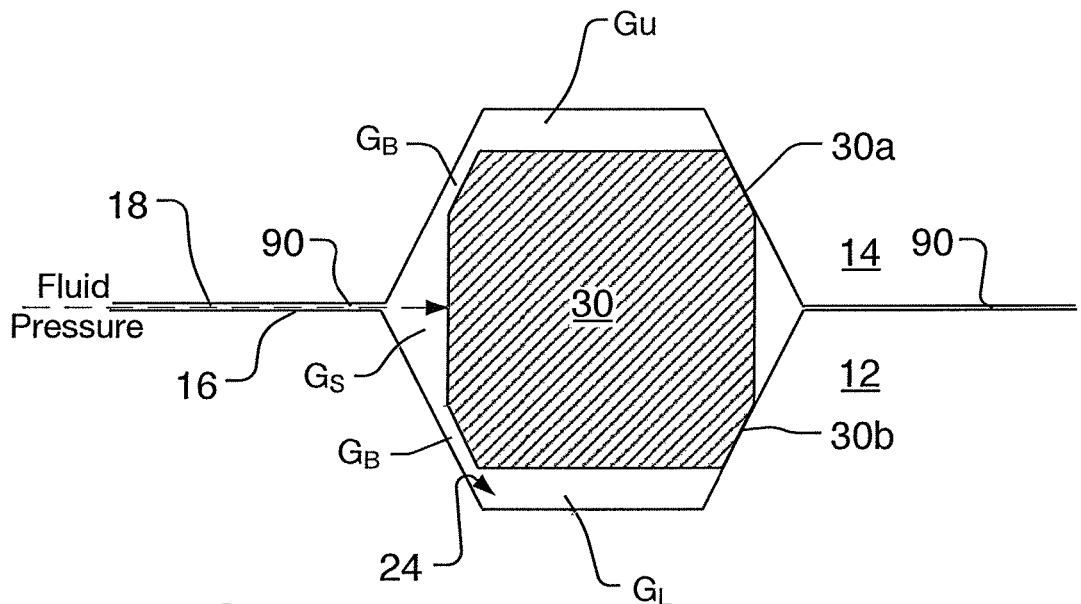
FIG. 6 is a cross-sectional view of the metal ring gasket shown in FIGS. 1 and 3 when the threaded union is in the sealed condition and under elevated fluid pressure.

FIG. 6 schematically illustrates the threaded union 10 when it is exposed to elevated fluid pressures. As is understood in the art, high fluid pressures in the fluid passage 15 (FIG. 3) force the end surfaces 16,18 of the first and second subcomponents 12,14 apart due to elastic deformation of the threaded nut 40. This creates a gap 90 between the first and second subcomponents 12,14. Fluid pressure flows through the gap 90 on the inner side of the metal ring gasket 30. The fluid pressure induces hoop stress in the metal ring gasket 30 that forces the sealing surfaces 30a, 30b of the metal ring gasket 30 into tighter contact with the corresponding surfaces of the annular cavity 24, and the seal is "energized". Consequently, the higher the fluid pressure (within the pressure capacity of the first and second subcomponents 12,14) in the central fluid passage 15, the more energized and tighter the fluid seal.

Figure 7:
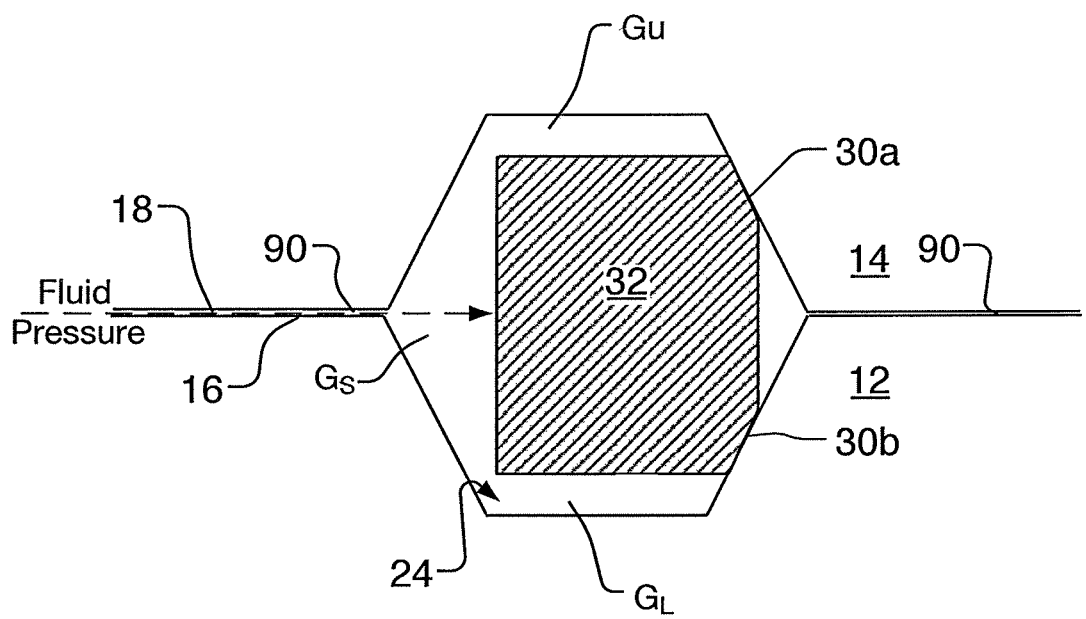
FIG. 7 is a cross-sectional view of another embodiment of a metal ring gasket in accordance with the invention in a sealed condition under elevated fluid pressures.

FIG. 7 schematically illustrates another embodiment of a metal ring gasket 32 in accordance with the invention. The metal ring gasket 32 has an outer diameter and outer beveled corners that are configured the same as described above with reference to FIGS. 4-6 and the metal ring gasket is elastically deformed in the annular cavity 24 in the same way. However, the metal ring gasket 32 is hexagonal in cross-section and has a flat inner side that is spaced from an inner surface of the annular cavity 24. The fluid pressure acts on the flat side to energize the seal as described above. As will be understood by those skilled in the art, the shape of the inner side, and consequently, the cross-sectional shape of the metal ring gaskets 30,32 is a matter of design choice.

The threaded union 10 in accordance with the invention may be used to construct a high-pressure, fluid-tight seal between a drilling flange, described in applicant's co-pending U.S. patent application Ser. No. 10/656,693 filed Sept. 4, 2003 and a wellhead on a wellhead assembly, as described and illustrated in applicant's co-pending U.S. patent application Ser. No. 10/690,142 (Dallas) entitled METAL RING GASKET FOR A THREADED UNION, which are hereby incorporated by reference, as well as a fluid conduit for any other application.

The metal ring gasket in accordance with the invention has been extensively pressure-tested in a number of threaded unions integrated into different wellhead and well stimulation tool components. It has proven to be extremely reliable and provides a very high-pressure energized seal that is easy to "torque up" using a hammer or a wrench. This permits such components to be more economically constructed and more quickly assembled. Cost savings are therefore realized, while worker safety and environmental protection are ensured.

As will be understood in the art, the metal ring gasket 30, 32 for the threaded union 10 can be used in a variety of applications to reduce cost, while ensuring high performance and safety in fluid conduits of all types, including wellhead assemblies and well stimulation equipment, where very high pressure and very high temperature resistance are especially important.

The embodiments of the invention described above are therefore intended to be exemplary only. The scope of the invention is intended to be limited solely by the scope of the appended claims.

We claim:

1. A high-pressure fluid conduit, comprising:
   a first fluid conduit subcomponent having a pin end with an annular groove in the pin end, a second fluid conduit subcomponent having a socket end that receives the pin end and has a complementary second annular groove in a bottom of the socket, the first and second annular grooves having respective annular outer faces that slope inwardly to a planar annular bottom surface of the respective annular grooves; and
   a metal ring gasket compressed between the respective ends of the first and the second fluid conduit subcomponents, the metal ring gasket deforming elastically, without plastic deformation, to provide an energized high-pressure fluid seal when the first and second fluid conduit subcomponents are drawn together by a nut, the metal ring gasket having a planar top face, a planar bottom face that is parallel to the planar top face, a cylindrical outer face, and an annular sloped surface between each of the planar top and bottom faces and the cylindrical outer face, the metal ring gasket being compressed by contact with only the respective first and second sloped annular outer faces of the respective first and second annular grooves when the first and second fluid conduit subcomponents are drawn together by the nut.

2. The high-pressure fluid conduit as claimed in claim 1 wherein the metal ring gasket has a cylindrical inner face that is parallel with the cylindrical outer face and forms a right angle with the respective top and bottom faces.

3. The high-pressure fluid conduit as claimed in claim 1 wherein the respective annular sloped surfaces of the metal ring gasket are respectively inclined at an angle of about 23° with respect to the cylindrical outer face.

4. The high-pressure fluid conduit as claimed in claim 1 wherein the metal ring gasket is made of ductile carbon steel.

5. The high-pressure fluid conduit as claimed in claim 1 wherein the metal ring gasket is made of ductile stainless steel.

6. The high-pressure fluid conduit as claimed in claim 1 wherein the metal ring gasket is hexagonal in cross-section.

7. The high-pressure fluid conduit as claimed in claim 1 wherein the nut comprises an upper annular shoulder that extends radially inwardly and abuts a radial flange of an annular, multi-piece adapter collar having an inner diameter dimensioned to encircle an outer surface of the first fluid conduit subcomponent and to rest on an annular shoulder of the first fluid conduit subcomponent adjacent the pin end.

8. The high-pressure fluid conduit as claimed in claim 7 wherein the adapter collar further comprises an annular groove that receives an inner edge of a segmented retainer.

9. The high-pressure fluid conduit as claimed in claim 8 wherein segments of the segmented retainer are secured to a top of the nut by threaded fasteners.

10. A threaded union comprising:
    a nut that draws together respective mating ends of a first subcomponent and a second subcomponent of the threaded union;
    the mating end of the first subcomponent comprising a first annular groove that mates with a complementary second annular groove in the mating end of the second subcomponent, the complementary first and second annular grooves respectively having a sloped annular outer face that extends to a respective planar bottom surface of the respective annular grooves; and
    a metal ring gasket received in the respective annular grooves, the metal ring gasket having a planar top face, a planar bottom face that is parallel to the planar top face, a cylindrical outer face that is perpendicular to the top and bottom faces, and an annular sloped surface between each of the planar top face, the planar bottom face and the cylindrical outer face, the metal ring gasket being elastically deformed, without any plastic deformation, by contact between only the respective sloped annular outer faces of the respective annular grooves and the respective annular sloped surfaces of the metal ring gasket when the mating ends of first and second subcomponents are drawn together by the nut.

11. The threaded union as claimed in claim 10 wherein the mating ends of the first and second subcomponents comprise a pin received in a socket, and the annular grooves are respectively located on an end of the pin and in a bottom of the socket.

12. The threaded union as claimed in claim 10 wherein the annular sloped surfaces of the metal ring gasket are respectively inclined at an angle of about 23° with respect to the cylindrical outer face.

13. The threaded union as claimed in claim 10 wherein the metal ring gasket is octagonal in cross-section.

14. The threaded union as claimed in claim 10 wherein the metal ring gasket is hexagonal in cross-section.

15. The threaded union as claimed in claim 10 wherein the metal ring gasket is elastically deformed by an annular compression of about 0.003" when the mating ends are drawn together by the nut.

16. The threaded union as claimed in claim 15 wherein the metal ring gasket contacts only the respective sloped annular outer faces of the respective annular grooves after the mating ends of the first and second subcomponents are drawn together by the nut.

17. The threaded union as claimed in claim 10 wherein the nut is a single piece construction.

18. The threaded union as claimed in claim 17 further comprising a multi-piece adapter collar that has an inner diameter dimensioned to encircle an outer surface of the second subcomponent and to rest on an annular shoulder adjacent the mating end of the second subcomponent.

19. The threaded union as claimed in claim 18 further comprising an annular groove in the multi-piece adapter collar that receives a segmented retainer secured to a top of the nut.

20. The threaded union as claimed in claim 19 further comprising threaded fasteners received in tapped bores in the top of the nut that secure respective segments of the segmented retainer to the nut.

* * * * *